United States Patent
Hicks et al.

(10) Patent No.: US 7,302,706 B1
(45) Date of Patent: Nov. 27, 2007

(54) NETWORK-BASED FILE SCANNING AND SOLUTION DELIVERY IN REAL TIME

(75) Inventors: Durwood A. Hicks, Beaverton, OR (US); Vincent P. Gullotto, Beaveton, OR (US)

(73) Assignee: McAfee, Inc, Santa Clara, CA (US)

( * ) Notice: Subject to any disclaimer, the term of this patent is extended or adjusted under 35 U.S.C. 154(b) by 1092 days.

(21) Appl. No.: 09/968,569

(22) Filed: Sep. 28, 2001

Related U.S. Application Data (60) Provisional application No. 60/316,715, filed on Aug. 31, 2001.

(51) Int. Cl.
*H04L 29/00* (2006.01)
(52) U.S. Cl. ...................................................... 726/24
(58) Field of Classification Search ................ 713/188, 713/201; 726/24
See application file for complete search history.

(56) References Cited

U.S. PATENT DOCUMENTS

| | | | |
|---|---|---|---|
| 5,440,723 A * | 8/1995 | Arnold et al. .................. 714/2 |
| 5,511,163 A | 4/1996 | Lerche et al. .......... 398/183.04 |
| 5,796,942 A * | 8/1998 | Esbensen ..................... 713/201 |
| 5,832,208 A * | 11/1998 | Chen et al. .................. 713/201 |
| 5,960,170 A * | 9/1999 | Chen et al. ..................... 714/38 |
| 6,144,960 A | 11/2000 | Okada et al. .................. 707/10 |
| 6,219,669 B1 * | 4/2001 | Haff et al. ..................... 707/10 |
| 6,347,375 B1 * | 2/2002 | Reinert et al. .............. 713/200 |
| 6,785,732 B1 * | 8/2004 | Bates et al. .................. 709/232 |
| 6,842,861 B1 * | 1/2005 | Cox et al. .................... 713/188 |
| 7,032,005 B2 * | 4/2006 | Mathon et al. ............. 709/206 |
| 2002/0004908 A1 * | 1/2002 | Galea ......................... 713/200 |
| 2002/0087624 A1 * | 7/2002 | Liebenow .................... 709/203 |

OTHER PUBLICATIONS

Microsoft Computer Dictionary, 5th Edition. 2002.*

* cited by examiner

*Primary Examiner*—Kambiz Zand
*Assistant Examiner*—Andrew L Nalven
(74) *Attorney, Agent, or Firm*—Zilka-Kotab, PC; Christopher J. Hamaty (57) ABSTRACT

A system, method and computer program product are provided for a network-based method for scanning date. First, data is received from a client at a server utilizing a network. The data is scanned at the server for analysis purposes. A solution is generated at the server if malicious code is found in the data during the scanning. The solution is sent from the server to the client utilizing the network.

68 Claims, 9 Drawing Sheets

NETWORK-BASED FILE SCANNING AND SOLUTION DELIVERY IN REAL TIME

RELATED APPLICATION(S)

The present application claims priority from a provisional patent application filed Aug. 31, 2001 under Ser. No. 60/316,715, which is incorporated herein by reference.

FIELD OF THE INVENTION

The present invention relates to system security, and more particularly to real time network-based malicious code handling.

BACKGROUND OF THE INVENTION

Network security management is becoming a more difficult problem as networks grow in size and become a more integral part of organizational operations. Attacks on networks are growing both due to the intellectual challenge such attacks represent for hackers and due to the increasing payoff for the serious attacker. Furthermore, the attacks are growing beyond the current capability of security management tools to identify and quickly respond to those attacks. As various attack methods are tried and ultimately repulsed, the attackers will attempt new approaches with more subtle attack features. Thus, maintaining network security is an on-going, ever changing, and increasingly complex problem.

Computer network attacks can take many forms and any one attack may include many security events of different types. Security events are anomalous network conditions each of which may cause an anti-security effect to a computer network. Security events including stealing confidential or private information; producing network damage through mechanisms such as viruses, worms, or Trojan horses; overwhelming the network's capability in order to cause denial of service; and so forth.

Of particular concern is the speed at which malicious code can spread throughout a single computer and even a network of computers. Many computers run anti-virus software that can be updated periodically. However, one problem is that only those viruses known prior to the last update are detected. Thus, a new virus may be undetectable. Further, in a network setting, such as a corporate intranet, only some of the computers may be running anti-virus software, while the others remain vulnerable to infection.

The prior art has attempted to remedy these problems by allowing users to send a file that they suspect is infected with malicious code to an administrator at a remote server via electronic mail. The administrator looks at the files and determines if they are infected. If so, the virus signature is identified and added to a DAT file, which is archived and stored. The user must then retrieve the updated DAT file from a general download site once it becomes available, install it, and perform a local virus scan. By then, hours and, more likely, days have passed, in which time the virus has spread.

Other prior art systems have attempted to push scanning software onto the client computer to perform a scan on the client computer. Again, the DAT file has been created prior to the user request. Thus, if the virus signature is not included in the DAT file, the scanning software will not detect the virus.

What is needed is a way to pull or receive a potentially infected file from a client device, create a solution, and send the solution back to the user in real time.

DISCLOSURE OF THE INVENTION

A system, method and computer program product are provided for network-based real time data scanning. First, data is received from a client at a server utilizing a network such as the Internet. The data is scanned at the server for analysis purposes. A solution is generated at the server if malicious code is found in the data during the scanning. The solution is sent from the server to the client utilizing the network.

In one aspect, an indication that the data is clean is sent from the server to the client utilizing the network if no malicious code is found in the data during the scanning. The data can be sent from the client to the server via electronic mail. Similarly, the solution can be sent from the server to the client via electronic mail.

In another aspect, a user interface, such as an HTML page for display on a web browser, is output utilizing the network. The user interface preferably assists a user in sending the data to the server. As an option, a pointer to the solution can be output on the user interface.

Preferably, the user interface is update at predetermined intervals. As one option, the user interface presents a status update at predetermined intervals. As another option, a graphic is displayed on the user interface for illustrating a progress of the scanning.

In a further aspect, the solution is automatically installed on the client. The data received from the client can include multiple files that are sent to the server and scanned. These can include, for example, multiple files stored in a folder on the client, multiple files on compact disk, multiple image files, multiple file applications, etc.

The malicious code can be a virus, worm, trojan, etc. Preferably, the solution includes a removal file, such as a DAT file, which integrates with existing scanning software on the client.

In one aspect, a determination is made as to whether the malicious code is identified in an existing solution, and if so, the solution is generated using at least a portion of the existing solution and sent to the client. A name for the malicious code can also be generated if the malicious code is not identified in an existing solution. In a further aspect, the data can be launched into memory with pre-existing files. A determination is made as to whether the data alters the pre-existing files. A removal file (i.e., DAT file) for removing the malicious code from the client is generated. The solution includes the removal file.

DESCRIPTION OF THE PREFERRED EMBODIMENTS

Figure 1:
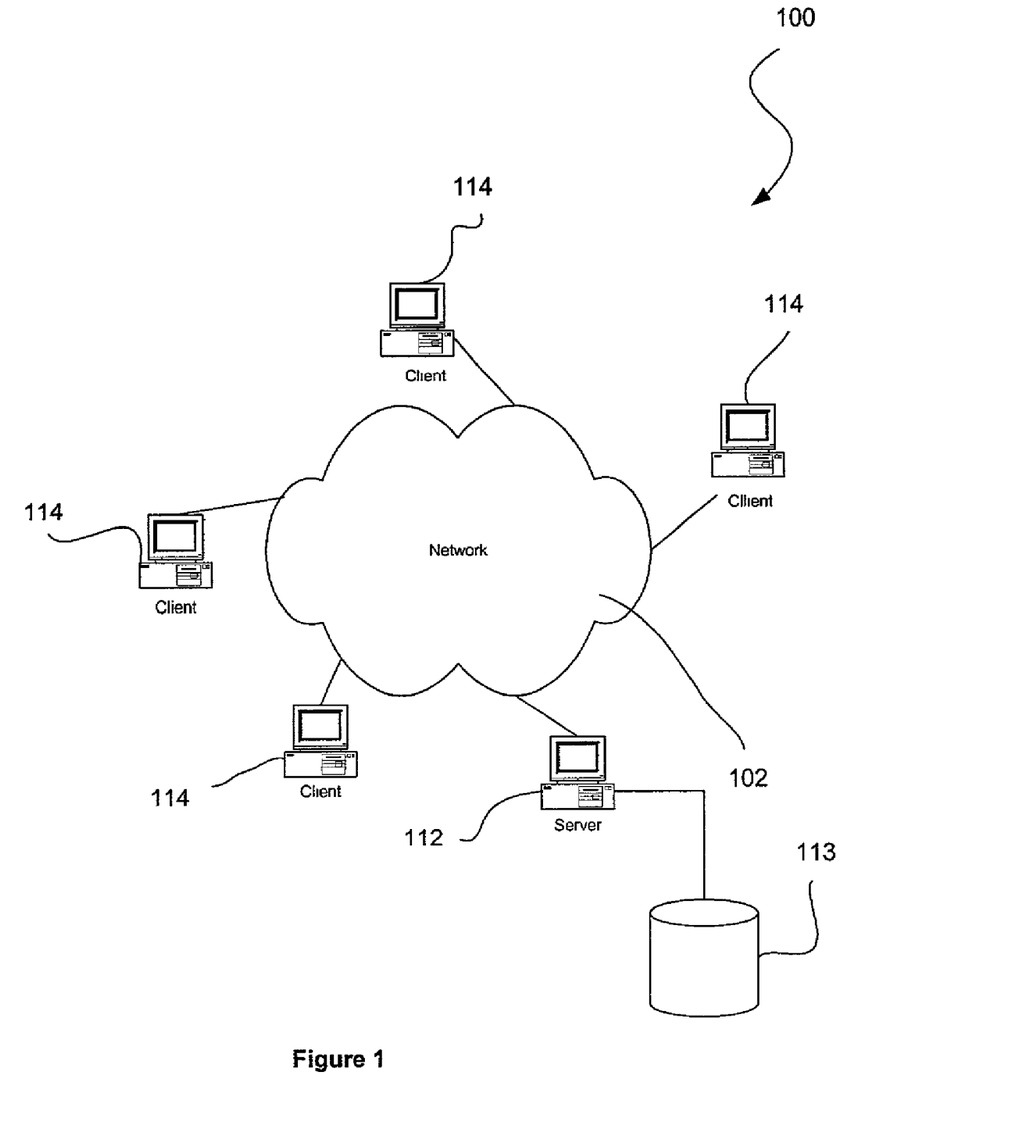
FIG. 1 illustrates an exemplary network environment in which the present invention may be implemented.

FIG. 1 illustrates an exemplary network environment 100 in which the present embodiment may be implemented. As shown, such network environment 100 includes a network 102 that may take any form including, but not limited to a local area network (LAN), a wide area network (WAN) such as the Internet, etc.

Coupled to the network 102 is a plurality of components 110 which may take the form of desktop computers, lap-top computers, hand-held computers, printers or any other type of computing hardware/software. In the content of the present invention, a plurality of target components 114 are provided which are coupled to at least one scanning computer 112 via the network 102. Such scanning computer 112 may be equipped with an accompanying database 113. In one embodiment, such database 113 may take the form of a virus information manager (VIM). As shown in FIG. 1, each of the target components 114 and various sub-components thereof may be accessed via different ports, i.e. 10, 125, 10345, etc.

Figure 2:
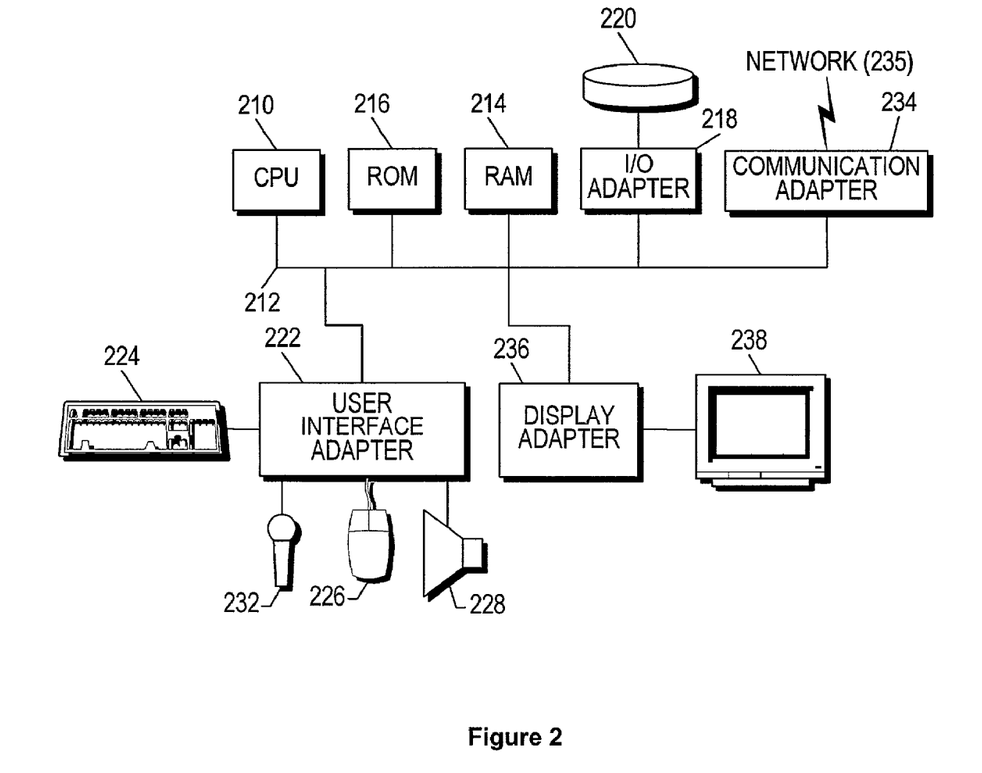
FIG. 2 shows a representative hardware environment that may be associated with the data servers and user devices of FIG. 1, in accordance with one embodiment.

FIG. 2 shows a representative hardware environment associated with the components 110 of FIG. 1, in accordance with one embodiment. Such figure illustrates a typical hardware configuration of a workstation in accordance with a preferred embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows NT or Windows/95 Operating System (OS), the IBM OS/2 operating system, the MAC/OS, or UNIX operating system. It will be appreciated that a preferred embodiment may also be implemented on platforms and operating systems other than those mentioned. A preferred embodiment may be written using JAVA, C, and/or C++ language, or other programming languages, along with an object oriented programming methodology. Object oriented programming (OOP) has become increasingly used to develop complex applications.

Figure 3:
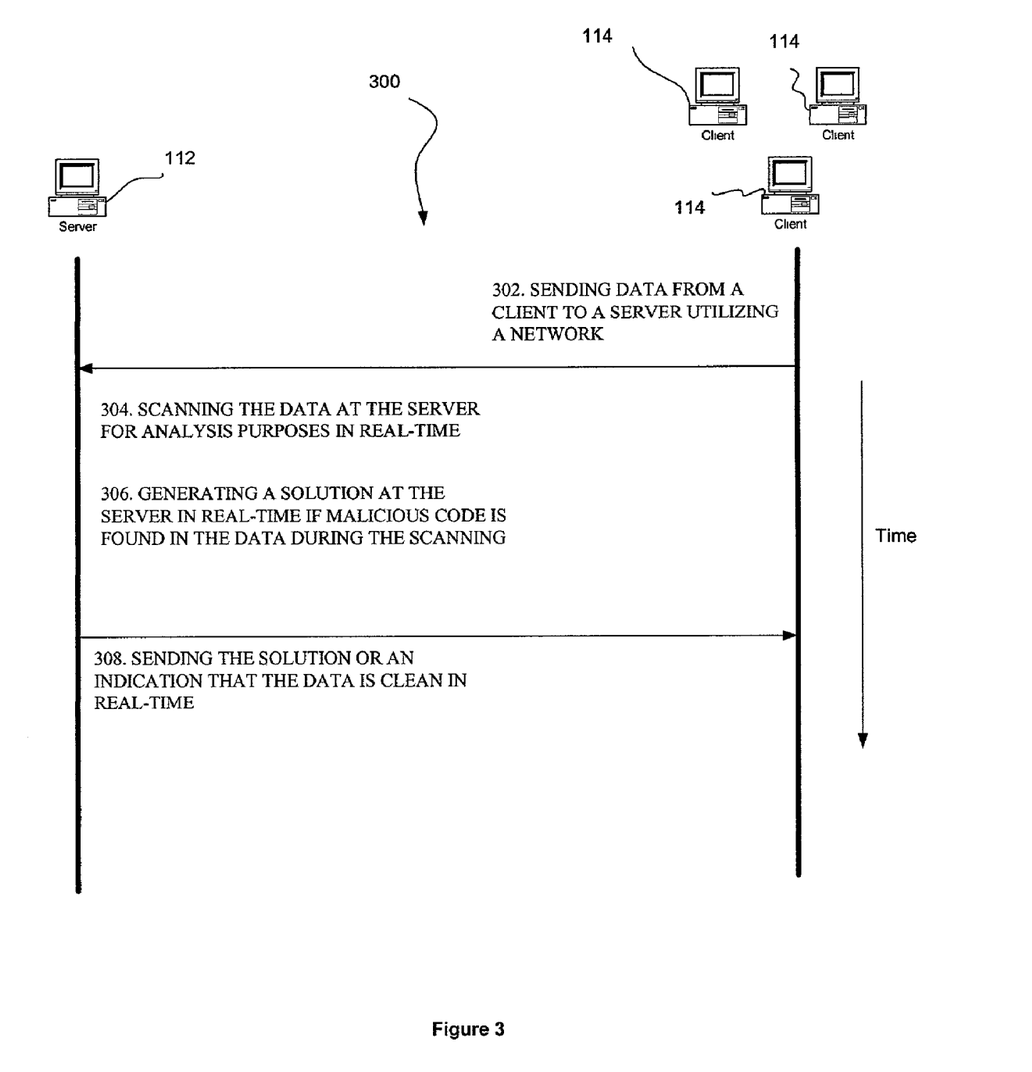
FIG. 3 is a flow diagram depicting a process for network-based real time data scanning according to one embodiment.

FIG. 3 is a flow diagram depicting a process 300 for network-based real time data scanning. As shown, in operation 302, data is received from a client 114 at a server 112 utilizing a network. In operation 304, the data is scanned at the server 112 for analysis purposes. A solution is generated at the server 112 in operation 306 if malicious code is found in the data during the scanning. In operation 308, the solution, or a statement that the data is clean, is sent from the server 112 to the client 114 utilizing the network.

Figure 4:
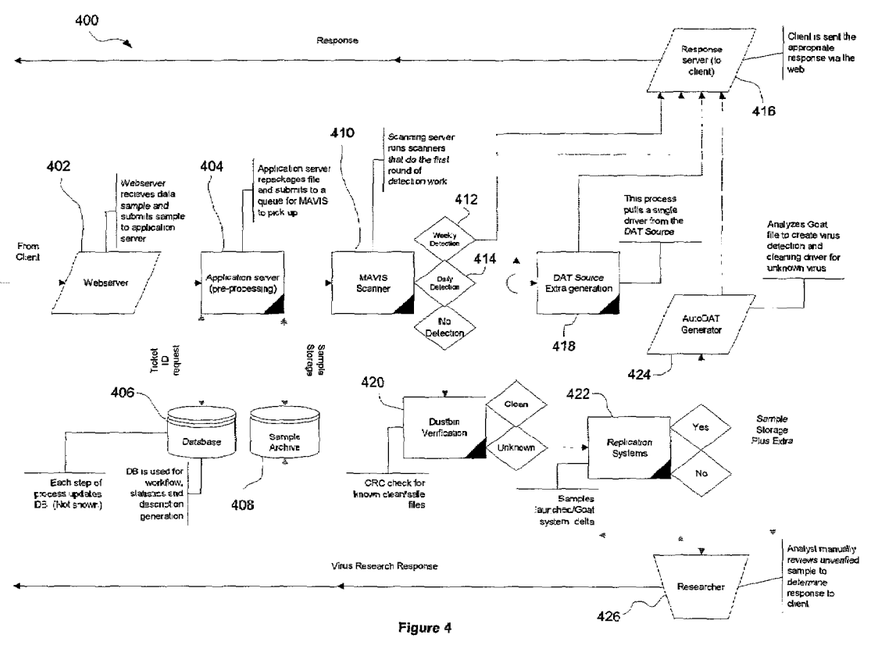
FIG. 4 illustrates a system and corresponding process flow for providing real time file scanning and solution delivery according to one embodiment of the present invention.

FIG. 4 illustrates a system 400 and corresponding process flow for providing real time file scanning and solution delivery according to one embodiment of the present invention. The process allows, for example, receipt of data suspected of containing malicious code from a user and/or client device via the Internet and the subsequent sending of an automated response and/or an automated instant fix over the Internet.

Malicious code includes any program that performs or attempts to perform any unauthorized act. For example, one type of malicious code is a virus. A virus is a software program that self-replicates recursively. Viruses may damage data, cause the computer to crash, display messages, or lie dormant. Another type of malicious code is a worm, which is a virus that usually replicates using computer networks, such as via email or Internet Relay Chat (IRC). Yet another type is a trojan, a program that either pretends to have, or is described as having, a set of useful or desirable features, but actually contains a damaging payload.

A webserver 402 receives data from a client via a network. The data is a data sample that the client believes may be infected with malicious code, and may comprise one or more files, or portions of a file(s). The system 400 preferably allows the client to upload data directly from the PC to the webserver 402.

Figure 5:
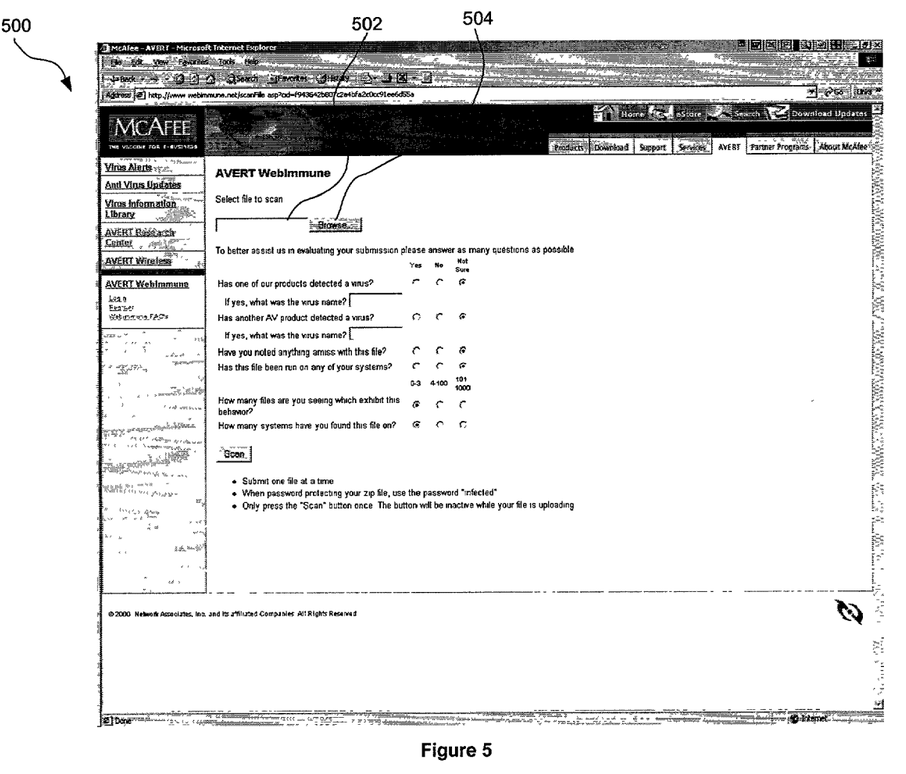
FIG. 5 illustrates an initial web-based graphical user interface from which the client can select data to submit for scanning according to one embodiment.
Figure 6:
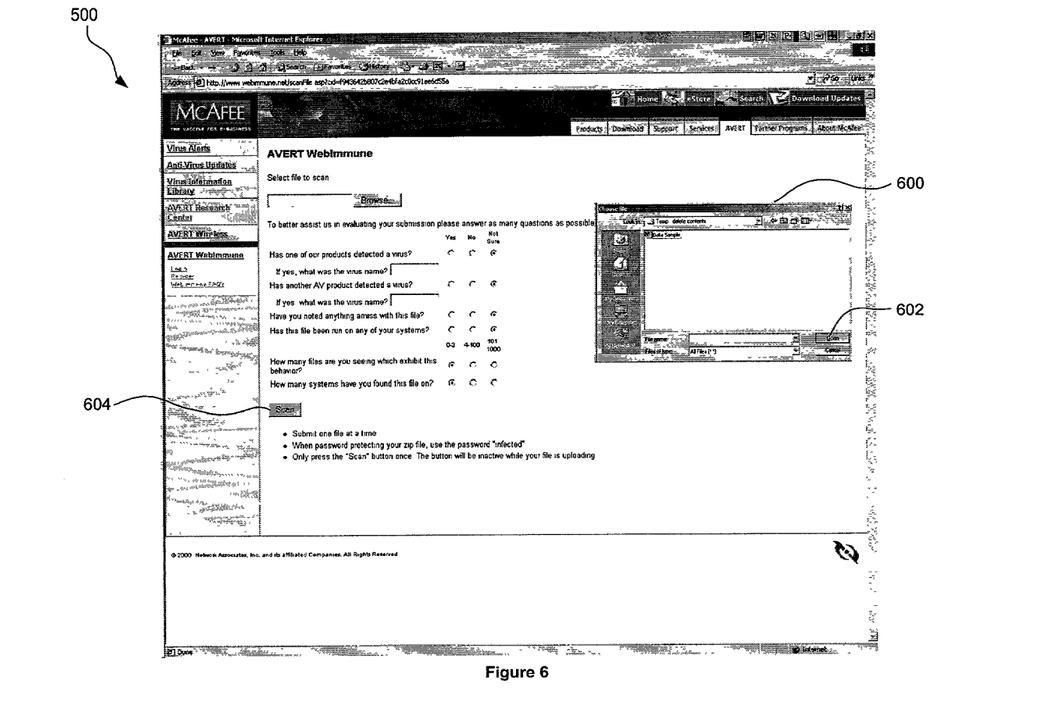
FIG. 6 illustrates the graphical user interface of FIG. 5 further depicting a file selection window according to an embodiment.

FIG. 5 illustrates a web-based Graphical User Interface (GUI) 500 from which the client can select data for upload to the webserver 402 for scanning. As shown, the client enters the name of the file to be scanned in the entry field 502, or selects the browse button 504. The system GUI can provide a window or browser that allows the user to find the file they want to submit. Selection of the browse button opens the window 600 shown in FIG. 6. The user selects a file from the window 600 and selects the Open button 602 and then the Scan button 604 to begin the upload.

If the upload fails, a standard web message can be sent to the client indicating upload failure and instructing the client to try again. If the file is password protected and cannot be opened, the client can be prompted to re-submit the file with a password of "infected" or other predefined password. As an option, if the file is greater than 2 MB, the client can be prompted to submit the file via e-mail. (This is an artificial limitation to reduce load on the system 400. See FIG. 4). As another option, if more than one file is submitted by the client, the client can be prompted to submit only one file, or submit the multiple files through e-mail. (This is an artificial limitation to reduce load on the system 400).

With continued reference to FIG. 4, the webserver 402 pushes the data to an application server 404. The application server 404 pre-processes the submission. The pre-processing includes determining a size of the file received from the client and determining a name and/or description of the sample, preferably based on information from a database 406. If no existing name or description is found in the database 406, the application server 404 can generate a name and/or description for the sample, such as sample23a or user23a for example. If the file is zipped, the application server 404 unpacks it. If the sample is password protected, the application server 404 attempts to open it.

The application server 404 also validates that the customer is entitled to the service, such as by verifying a user identifier, and requests a ticket ID from the database 406. Then the sample is re-zipped with the ticket ID and can be password protected for submission to a queue. The original submission and repackaged submission are archived on a storage server 408.

The scanning server 410 runs one or more scanners 412, 414 which attempt to identify whether the original submission and/or repackaged submission contain malicious code. Preferably, the scanning server 410 runs scanning software associated with the McAfee AVERT Virus Identification System (MAVIS), available from McAfee, 3965 Freedom Circle, Santa Clara, Calif. 95054. McAfee is a Network Associates, Inc. company.

AVERT (Anti-Virus Emergency Response Team) is a division of McAfee, and is an anti-virus research center where scientists research the latest threats, and uncover threats which may arise in the future.

According to one embodiment the scanning server 410 runs two commandline scanners 412, 414. Scanner 1 412 runs with Weekly released DAT files. Scanner 2 414 runs with Daily released DAT files, i.e., DAT files updated daily.

If the scanning server 410 detects a virus in the Weekly DATs, a response is forwarded to the response server 416, which can be a web server, an email server, etc. The response server 416 sends the response with a solution to the client on a website (or by email), preferably in under 90 seconds.

Figure 7:
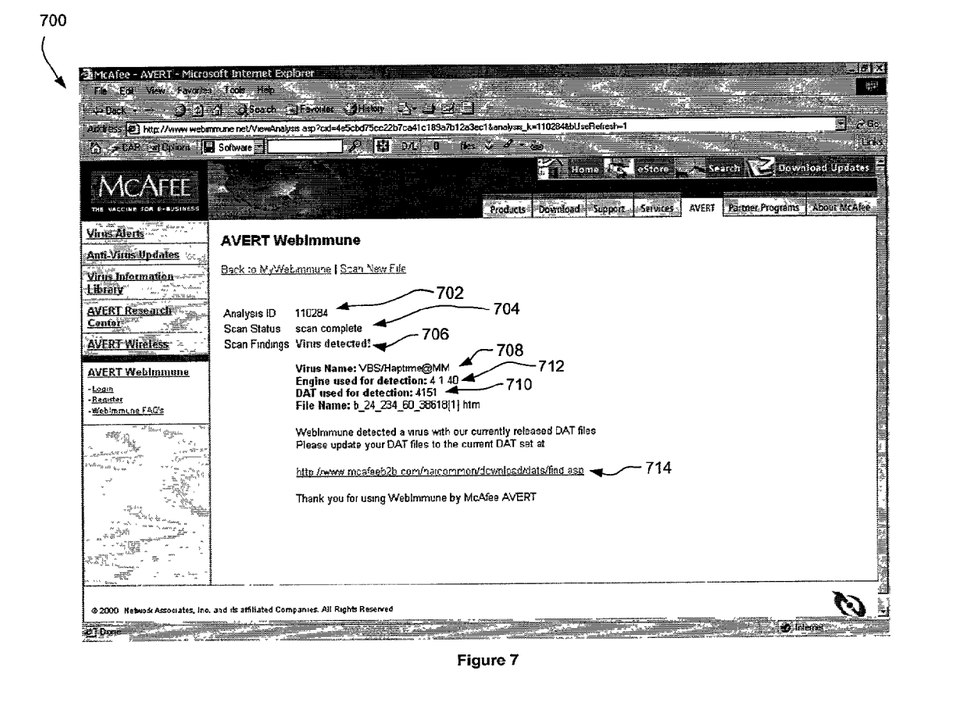
FIG. 7 illustrates a graphical user interface displayed upon detection of a virus according to an embodiment.

FIG. 7 illustrates a GUI 700 displayed upon detection of a virus. As shown, the GUI displays the Ticket ID 702, a status 704, results 706, the virus name 708, and what DAT 710 and engine 712 were used to detect the virus. A pointer 714 to the updated DAT file can be provided. The client is prompted to update his or her scanning software with the DAT and/or engine. As an option, the update on the client device can be performed automatically without user intervention. The database 406 is updated and the ticket is closed. Note that status updates may be sent to the client indicating the progression of the process.

If the scanning server 410 detects a virus in the Daily DATs, a response is sent to the client on a website (or by email), preferably in under 90 seconds with the virus name, a link to an EXTRA.DAT (see below), and what engine was used to detect the virus, with some exceptions (see the section below discussing Daily DAT detection exceptions). The database 406 is updated and the ticket is closed.

The Daily EXTRA.DAT is generated by an EXTRA.DAT generator 418. The generator process looks at the code sources of the DAILY.DATs and pulls the specific driver(s) used to detect the virus. This driver is compiled into an EXTA.DAT that can be used by the client's Anti-Virus software to detect instances of the malicious code on the client device.

Preferably, the scanning software includes powerful heuristic abilities, making it possible for the scanners 412, 414 to detect or suspect a file is infected with a new virus that has never been seen before. Heuristic detections are identifiable by the wording NEW or Variant preceding the virus name.

New: Indicates a possible brand new strain of virus. As such, the DAILY source does not contain a proper driver capable of reliably cleaning the file. Also, because it is potentially new, the sample is sent to Virus Research immediately.

Variant: Indicates that a known virus has been found, but modified by a virus writer to the point that the DAILY DATs may not be able to reliably clean the virus. The sample is sent to Virus Research immediately.

Virus Research, as referred to herein, can be a source of malicious code identification data and/or entity to which questionable data is sent for analysis. Note that the information received from and sent to Virus Research may be received from or sent to any other entity or database, including AVERT.

For a New or Variant detection the client is sent a response via the web that a possible new or variant virus has been found, and that a Virus Research Researcher 426 will respond to him or her shortly. The database 406 is updated and the ticket remains open. The Virus Research response is preferably sent via e-mail.

In the case that no virus, either known, new, or variant is determined to be found, the client is sent a response that further analysis is required, and to please wait another period of time, such as 30 seconds. The database 406 is updated and the ticket is left open. The sample is then sent to another automated system called the Dustbin 420.

The dustbin 420 is a custom made database containing CRC codes for files Virus Research has previously processed and determined are safe, or have a specific state desired to be monitored.

Safe: Defined as not viral or malicious.

Specific state: Has multiple definitions such as a Known False alarm, a Joke file, known corruption, etc.

If the file is determined by the dustbin 420 to be Safe and the scanners 412, 414 did not detect a virus, then the client is sent a web response stating that the file is known safe and not a threat. The response to the client at this point is preferably around the 120 second mark. The database 406 is updated and the ticket is closed. (As an example in the case of FORMAT.COM, a file native to the Microsoft Windows® operating system, the user may be relied upon to user the file responsibly).

If the dustbin 420 returns a value other than safe, the submission is sent to the Replication Systems 422. The client is sent a response via the web or email that the file requires further analysis. The database 406 is updated and the ticket remains open.

The replication systems 422 include one or more replicators. Replicators that can be used include Win32, DOS, and Macro replicators. The replicators receive a sample. The sample is launched into memory and allowed to attempt to infect "Goat" files. Goat files are files that have known properties, i.e., it is known exactly what they are, what they look like, and what they do. Whether the replication is successful is determined by whether the Goat files have been modified in some manner. If replication is successful, the Goat files are a different size or have different functionality.

If replication is successful, the file sample and Goat files are sent to the AutoDAT Generator 424 for final analysis. The AutoDAT generator 424 analyzes the Goat files for the delta (changed) information and creates a DAT driver capable of detection and removal of virus code. The driver is compiled as an EXTRA.DAT and is sent to the client via the web and/or e-mail. The database 406 is updated and the ticket is left open.

Preferably, when creating EXTRA.DAT files the AutoDAT generator 424 generates a name for any virus found in real time. For example, the AutoDAT generator 424 can name each virus Auto_Driver, prefixed with an identifier such as W32/, WM/, W95/, W95M, W97M, X97M. One example of such a name is W32/Auto_Driver.

The AutoDAT generator 424 zips the EXTRA.DAT and Goat files into the original zip package created by the application server 404 and stores the sample on the archive server 408.

The AutoDAT generator 424 sends an e-mail to Virus Research indicating that a new virus has been discovered and a detection/removal driver has been created. The Auto- DAT generator 424 updates the database 406 and re-assigns the owner of the ticket to a Researcher 426. The Researcher 426 reviews the sample and driver and checks the driver into the DAILY Source. The Researcher 426 also updates the database 406 and closes the ticket.

If a file does not successfully replicate this may not be an indicator the file is safe. The file may contain malicious code that is undetectable to the automated scanning system and/or for which a solution cannot be generated. However, these types are not undetectable or resolvable to a human being.

Figure 8:
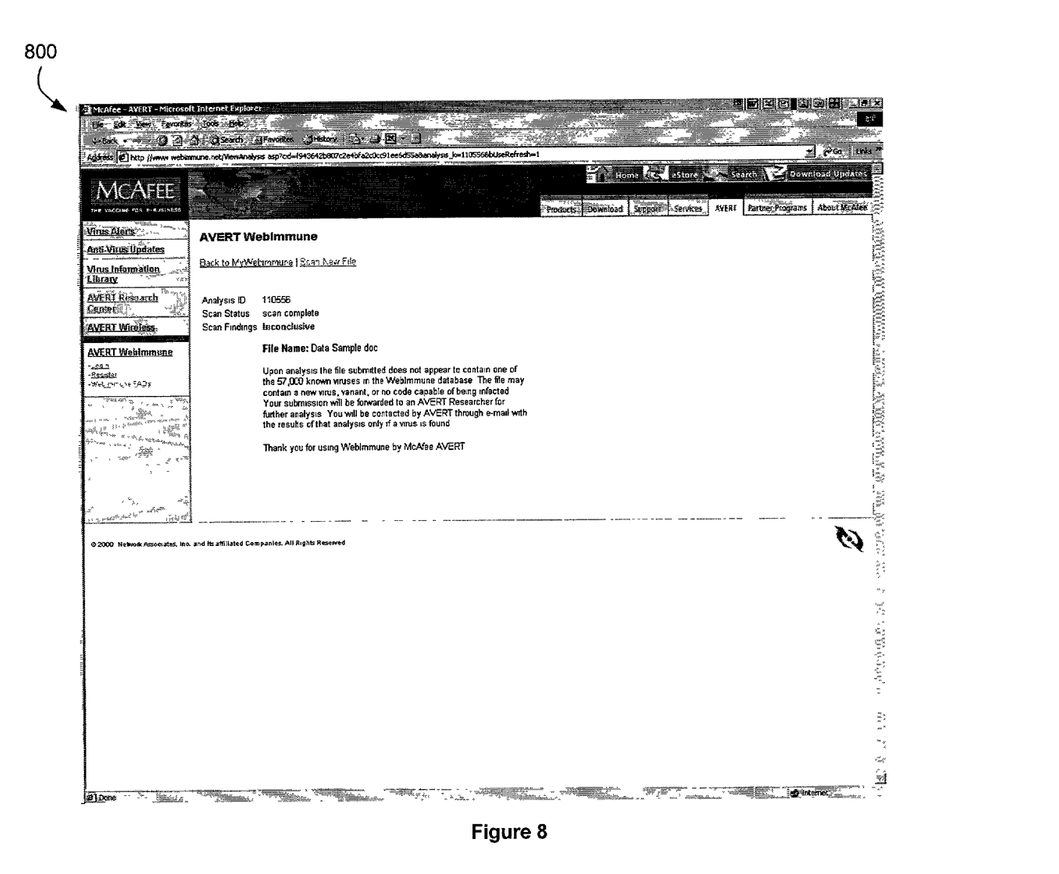
FIG. 8 illustrates a graphical user interface displayed if further inquiry is needed during examination of the client data according to an embodiment.

If the replication is unsuccessful, the client is sent a response via the web indicating that the file has been analyzed but its condition as "safe" has not been determined. The sample is preferably forwarded to a Researcher 426 for manual review. FIG. 8 illustrates a GUI 800 displayed upon the dustbin 420 returning a value other than safe. Referring again to FIG. 4, the AutoDAT generator 424 updates the database 406 and re-assigns the owner of the ticket to a Researcher 426.

The Virus Research Researcher 426 determines if the file is safe, infected, or special. In the case of an infected or special file, Virus Research responds to the client via e-mail with the solution or answer, which can either contain an EXTRA.DAT as a solution or a note saying the file is safe.

Safe: CRC code is taken of the submitted file and loaded into the dustbin 420.

Infected: If infected a detection/removal driver is created and sent to the client. The driver is checked into the DAILY source.

Special: There are other non-viral types of threats or perceived threats that may be outside the scope of the process, such as joke programs, malicious batch files, or corrupted files. Virus Research responds to the client in an e-mail explaining the analysis.

When analysis is complete the Researcher 426 manually updates the database 406 and closes the ticket.

As mentioned above, the system 400 is preferably accessible online utilizing an Internet-based GUI, which allows the system 400 to provide several optional features. One such feature is on-line registration. All users can be required to register before using the system 400. The registration information can then be used to respond to the client, store legacy scan information, and pull geographical statistics on virus prevalence.

As mentioned above, the system 400 preferably responds to the client in less than 90 seconds, but the scan information of the user can also be stored in a database. The user can then view the scan information on the web at a later time. Thus, the user does not have to wait for a response; he or she can submit the data and then return later to view the scan results.

Figure 9:
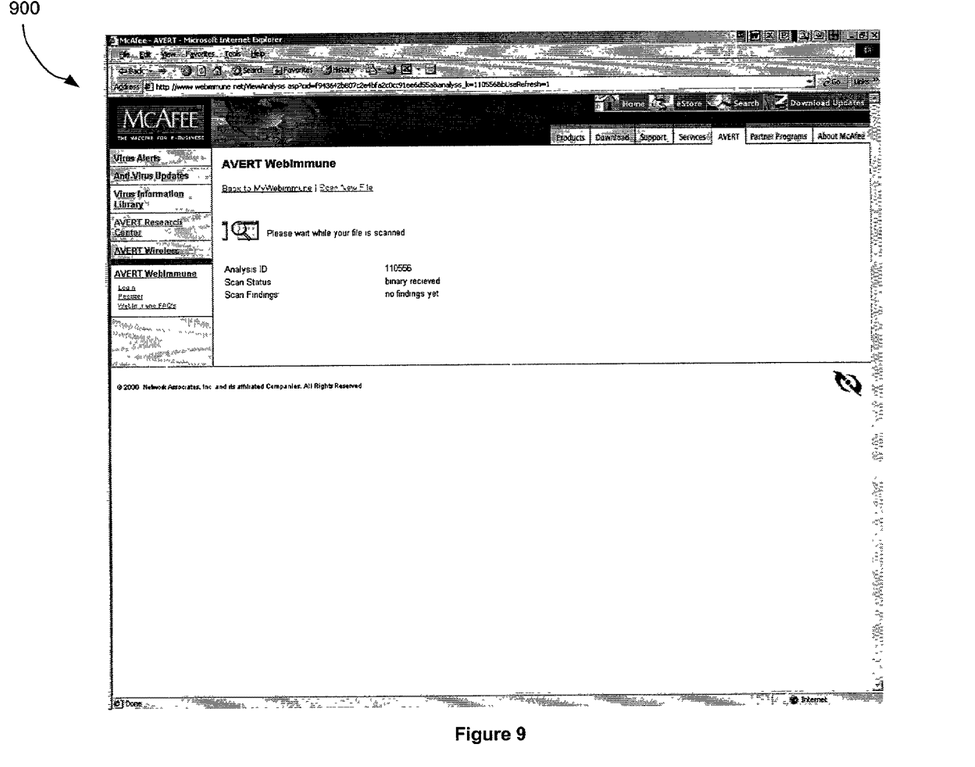
FIG. 9 depicts a graphical user interface that is displayed during scanning according to one embodiment.

FIG. 9 depicts a GUI 900 that is displayed during scanning according to one embodiment. As an option, the GUI 900 displays a graphic while scanning takes place to illustrate the progress to the client. The progress page can be set to automatically refresh after predetermined intervals of time, such as every 10 seconds, 20 seconds, etc.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A network-based method for scanning data, comprising:
   displaying at a client a web-based graphical user interface including a first data selection icon and a second scan icon, which is loaded via a network browser;
   in response to a selection of the first data selection icon, displaying a window showing a plurality of files stored on the client;
   receiving a manual selection of at least one of the files as data to be received from the client;
   in response to a selection of the second scan icon, receiving the data from the client at a server utilizing a network and the web-based graphical user interface, such that the data is transmitted from the client to the server to scan the data at the server for analysis purposes;
   generating a solution at the server if malicious code is found in the data during the scanning; and
   sending the solution from the server to the client utilizing the network;
   wherein if the selected at least one of the files is password protected, a window is displayed for entering at least one associated password.

2. The method as recited in claim 1, further comprising sending an indication that the data is clean from the server to the client utilizing the network if no malicious code is found in the data during the scanning.

3. The method as recited in claim 1, wherein the data is sent from the client to the server via electronic mail.

4. A network-based method for scanning data, comprising:
   displaying at a client a web-based graphical user interface including a first data selection icon and a second scan icon, which is loaded via a network browser;
   in response to a selection of the first data selection icon, displaying a window showing a plurality of files stored on the client;
   receiving a manual selection of at least one of the files as data to be received from the client;
   in response to a selection of the second scan icon, receiving the data from the client at a server utilizing a network and the web-based graphical user interface, such that the data is transmitted from the client to the server to scan the data at the server for analysis purposes;
   generating a solution at the server if malicious code is found in the data during the scanning; and
   sending the solution from the server to the client utilizing the network;
   wherein the solution is sent from the server to the client via electronic mail,
   wherein if the selected at least one of the files is password protected, a window is displayed for entering at least one associated password.

5. The method as recited in claim 1, further comprising outputting a user interface utilizing the network.

6. The method as recited in claim 5, wherein a pointer to the solution is output on the user interface.

7. The method as recited in claim 5, wherein the user interface is updated at predetermined intervals.

8. The method as recited in claim 5, wherein the user interface presents a status update at predetermined intervals.

9. The method as recited in claim 5, further comprising displaying a graphic on the user interface for illustrating a progress of the scanning.

10. The method as recited in claim 1, wherein the solution is automatically installed on the client.

11. The method as recited in claim 1, wherein the data includes multiple files that are sent to the server and scanned.

12. The method as recited in claim 1, wherein the malicious code is at least one of a virus, worm, and trojan.

13. The method as recited in claim 1, wherein the network is the Internet.

14. The method as recited in claim 1, wherein the solution includes a removal file for removing the malicious code from the client.

15. The method as recited in claim 14, wherein the removal file is generated in real time.

16. The method as recited in claim 1, further comprising determining whether the malicious code is identified in an existing solution, wherein the generated solution is generated using at least a portion of the existing solution.

17. The method as recited in claim 1, further comprising generating a name for the malicious code if the malicious code is not identified in an existing solution.

18. The method as recited in claim 1, further comprising launching the data into memory with pre-existing files, determining whether the data alters the pre-existing files, and generating a removal file for removing the malicious code from the client, wherein the solution includes the removal file.

19. The method as recited in claim 1, wherein a message is displayed at the client if the data fails to be received from the client at the server.

20. The method as recited in claim 1, wherein if the selected at least one file is larger than a predetermined amount, the file is required to be sent from the client to the server via electronic mail.

21. A computer program product for network-based data scanning, comprising:
    computer code for displaying at a client a web-based graphical user interface including a first data selection icon and a second scan icon, which is loaded via a network browser;
    computer code for displaying a window showing a plurality of files stored on the client, in response to a selection of the first data selection icon;
    computer code for receiving a manual selection of at least one of the files as data to be received from the client;
    computer code for receiving the data from the client at a server utilizing a network in response to a selection of the second scan icon, the web-based graphical user interface, such that the data is transmitted from the client to the server to scan the data at the server for analysis purposes;
    computer code for generating a solution at the server if malicious code is found in the data during the scanning; and
    computer code for sending the solution from the server to the client utilizing the network;
    wherein if the selected at least one of the files is password protected, a window is displayed for entering at least one associated password.

22. An Internet-based method for scanning data, comprising:
    displaying at a client a web-based graphical user interface including a first data selection icon and a second scan icon, which is loaded via a network browser;
    in response to a selection of the first data selection icon, displaying a window showing a plurality of files stored on the client;
    receiving a manual selection of at least one of the files as data to be received from the client;
    in response to a selection of the second scan icon, receiving the data from the client at a server utilizing a network and the web-based graphical user interface, such that the data is transmitted from the client to the server to scan the data at the server for analysis purposes;
    generating a solution at the server if malicious code is found in the data during the scanning, wherein the solution includes a removal file;
    sending an indication that the data is clean from the server to the client utilizing the Internet if no malicious code is found in the data during the scanning; and
    sending the solution from the server to the client utilizing the Internet;
    wherein if the selected at least one of the files is password protected, a window is displayed for entering at least one associated password.

23. A system for network-based data scanning, comprising:
    logic for displaying at a client a web-based graphical user interface including a first data selection icon and a second scan icon, which is loaded via a network browser;
    logic for displaying a window showing a plurality of files stored on the client, in response to a selection of the first data selection icon;
    logic for receiving a manual selection of at least one of the files as data to be received from the client;
    logic for receiving the data from the client at a server utilizing a network in response to a selection of the second scan icon, utilizing the web-based graphical user interface, such that the data is transmitted from the client to the server to scan the data at the server for analysis purposes;
    logic for generating a solution at the server if malicious code is found in the data during the scanning; and
    logic for sending the solution from the server to the client utilizing the network;
    wherein if the selected at least one of the files is password protected a window is displayed for entering at least one associated password.

24. An Internet-based method for scanning data, comprising:
    displaying at a client a web-based graphical user interface including a first data selection icon and a second scan icon, which is loaded via an Internet browser;
    in response to a selection of the first data selection icon, displaying a window showing a plurality of files stored on the client;
    receiving a manual selection of at least one of the files as data to be received from the client;
    in response to a selection of the second scan icon, receiving the data from the client at the server, utilizing the Internet and the web-based graphical user interface, such that the data is transmitted from the client to the server to scan the data at the server for analysis purposes;
    generating a solution at the server if malicious code is found in the data during the scanning, wherein the solution includes a removal file;
    sending an indication that the data is clean from the server to the client utilizing the Internet if no malicious code is found in the data during the scanning; and
    sending the solution from the server to the client utilizing the Internet;

wherein if the selected at least one of the files is password protected, a window is displayed for entering at least one associated password.

25. The method as recited in claim 24, wherein the data is sent from the client to the server via electronic mail.

26. The method as recited in claim 24, further comprising outputting a user interface utilizing the network, wherein the user interface assists a user in sending the data to the server.

27. The method as recited in claim 26, wherein a pointer to the solution is output on the user interface.

28. The method as recited in claim 26, wherein the user interface is updated at predetermined intervals.

29. The method as recited in claim 26, wherein the user interface presents a status update at predetermined intervals.

30. The method as recited in claim 26, further comprising displaying a graphic on the user interface for illustrating a progress of the scanning.

31. The method as recited in claim 24, wherein the solution is automatically installed on the client.

32. The method as recited in claim 24, wherein the data includes multiple files that are sent to the server and scanned.

33. The method as recited in claim 24, wherein the malicious code is at least one of a virus, worm, and trojan.

34. The method as recited in claim 24, wherein the removal file integrates with existing scanning software on the client.

35. The method as recited in claim 24, further comprising determining whether the malicious code is identified in an existing removal file, wherein the solution is generated using at least a portion of the existing removal file.

36. The method as recited in claim 24, wherein the removal file is generated in real time.

37. The method as recited in claim 24, further comprising generating a name for the malicious code if the malicious code is not identified in an existing solution.

38. The method as recited in claim 24, further comprising launching the data into memory with pre-existing files, determining whether the data alters the pre-existing files, and generating a removal file for removing the malicious code from the client, wherein the solution includes the removal file.

39. A computer program product for Internet-based data scanning, comprising:
   computer code for displaying at a client a web-based graphical user interface including a first data selection icon and a second scan icon, which is loaded via an Internet browser;
   computer code for displaying a window showing a plurality of files stored on the client, in response to a selection of the first data selection icon;
   computer code for receiving a manual selection of at least one of the files as data to be received from the client;
   computer code for receiving the data from the client at a server in response to a selection of the second scan icon, utilizing the Internet and the web-based graphical user interface, such that the data is transmitted from the client to the server to scan the data at the server for analysis purposes;
   computer code for generating a solution at the server if malicious code is found in the data during the scanning, wherein the solution includes a removal file;
   computer code for sending an indication that the data is clean from the server to the client utilizing the Internet if no malicious code is found in the data during the scanning; and
   computer code for sending the solution from the server to the client utilizing the Internet;
   wherein if the selected at least one of the files is password protected, a window is displayed for entering at least one associated password.

40. A system for Internet-based data scanning, comprising:
   logic for displaying at a client a web-based graphical user interface including a first data selection icon and a second scan icon, which is loaded via an Internet browser;
   logic for displaying a window showing a plurality of files stored on the client, in response to a selection of the first data selection icon;
   logic for receiving a manual selection of at least one of the files as data to be received from the client;
   logic for receiving the data from the client at a server in response to a selection of the second scan icon, utilizing the Internet- and the web-based graphical user interface, such that the data is transmitted from the client to the server to scan the data at the server for analysis purposes;
   logic for generating a solution at the server if malicious code is found in the data during the scanning, wherein the solution includes a removal file;
   logic for sending an indication that the data is clean from the server to the client utilizing the Internet if no malicious code is found in the data during the scanning; and
   logic for sending the solution from the server to the client utilizing the Internet;
   wherein if the selected at least one of the files is password protected, a window is displayed for entering at least one associated password.

41. A network-based method for scanning data, comprising:
   displaying at a client a web-based graphical user interface including a first data selection icon and a second scan icon, which is loaded via a network browser;
   in response to a selection of the first data selection icon, displaying a window showing a plurality of files stored on the client;
   receiving a manual selection of at least one of the files as data to be received from the client;
   in response to a selection of the second scan icon, receiving the data from the client at a server, utilizing a network and the web-based graphical user interface, such that the data is transmitted from the client to the server to scan the data at the server for analysis purposes;
   displaying a graphic on the user interface for illustrating a progress of the scanning;
   wherein the user interface is updated at predetermined intervals;
   launching the data into memory with pre-existing files;
   determining whether the data alters the pre-existing files;
   generating a solution at the server if malicious code is found in the data during the scanning;
   generating a removal file for removing the malicious code from the client;
   wherein the solution includes the removal file;
   wherein the removal file is generated in real time;
   generating a name for the malicious code if the malicious code is not identified in an existing solution;
   sending the solution from the server to the client utilizing the network;

wherein a pointer to the solution is output on the user interface; and sending an indication that the data is clean from the server to the client utilizing the network if no malicious code is found in the data during the scanning;

wherein if the selected at least one of the files is password protected, a window is displayed for entering at least one associated password.

42. An Internet-based method for scanning data, comprising:

displaying at a client a web-based graphical user interface including a first data selection icon and a second scan icon, which is loaded via an Internet browser;

in response to a selection of the first data selection icon, displaying a window showing a plurality of files stored on the client;

receiving a manual selection of at least one of the files as data to be received from the client;

in response to a selection of the second scan icon, receiving the data from the client at a server via the Internet, utilizing the web-based graphical user interface, such that the data is transmitted from the client to the server to scan the data at the server for analysis purposes;

sending an indication that the data does not contain malicious code from the server to the client utilizing the Internet if no malicious code is found in the data during the scanning; and sending an indication that the data contains malicious code from the server to the client utilizing the Internet if malicious code is found in the data during the scanning;

wherein if the selected at least one of the files is password protected, a window is displayed for entering at least one associated password.

43. The method as recited in claim 42, wherein the client is a personal computer and the server is a webserver.

44. The method as recited in claim 42, wherein the indications are sent via the user interface.

45. The method as recited in claim 42, wherein the user interface provides a mechanism for uploading the data to the server.

46. The method as recited in claim 45, wherein the mechanism for uploading the data to the server includes a field in which a user is allowed to enter a name of the at least one file to be scanned.

47. The method as recited in claim 42, wherein the first data selection icon includes a browse button on the web-based graphical user interface.

48. The method as recited in claim 42, further comprising determining whether a size of the data received is below a specified maximum data size.

49. The method as recited in claim 42, wherein a malicious code identification database used during the scanning to identify malicious code is updated daily.

50. The method as recited in claim 42, wherein the at least one file includes multiple files that are sent to the server and scanned.

51. The method as recited in claim 50, wherein the multiple files are sent as one file.

52. The method as recited in claim 51, wherein the multiple files are sent as one file in a compressed format.

53. The method as recited in claim 42, wherein the indication that the data contains malicious code includes a name of the malicious code.

54. The method as recited in claim 42, wherein the malicious code is at least one of a virus, worm, and trojan.

55. A network based method for scanning data, comprising:

displaying at a client a web-based graphical user interface including a first data selection icon and a second scan icon, which is loaded via a network browser;

in response to a selection of the first data selection icon, for displaying a window showing a plurality of files stored on the client;

receiving a manual selection of at least one of the files as data to be received from the client;

in response to a selection of the second scan icon, receiving the data from the client at a server via the network, utilizing the web-based graphical user interface, such that the data is transmitted from the client to the server to scan the data at the server for analysis purposes;

sending an indication that the data does not contain malicious code from the server to the client utilizing the network if no malicious code is found in the data during the scanning; and sending an indication that the data contains malicious code from the server to the client utilizing the network if malicious code is found in the data during the scanning;

wherein the indications are sent via the web-based graphical user interface;

wherein if the selected at least one of the files is password protected, a window is displayed for entering at least one associated password.

56. The method as recited in claim 55, wherein the client is a personal computer and the server is a webserver.

57. The method as recited in claim 55, wherein the mechanism for uploading the data to the server includes a field in which a user is allowed to enter a name of the at least one file to be scanned.

58. The method as recited in claim 55, wherein the first data selection icon includes a browse button on the web-based graphical user interface.

59. The method as recited in claim 55, further comprising determining whether a size of the data received is below a specified maximum file size.

60. The method as recited in claim 55, wherein a malicious code identification database used during the scanning to identify malicious code is updated daily.

61. The method as recited in claim 55, wherein the data includes multiple files that are sent to the server and scanned.

62. The method as recited in claim 61, wherein the multiple files are sent as one file.

63. The method as recited in claim 62, wherein the multiple files are sent as one file in a compressed format.

64. The method as recited in claim 54, wherein the indication that the data contains malicious code includes a name of the malicious code.

65. The method as recited in claim 54, wherein the malicious code is at least one of a virus, worm, and trojan.

66. An Internet-based method for scanning data, comprising:

outputting a user interface via the Internet;

receiving a file;

said user interface providing a mechanism for uploading the file from a client to a server and a scan icon for scanning the uploaded file;

said client being a personal computer and said server being a webserver;

said mechanism for uploading the file to the server including a field in which a user is allowed to enter a name of the file to be scanned;

said mechanism for uploading the file to the server including a window that displays files stored on the client, wherein a user is allowed to select a file to be scanned via the window, wherein the window is displayed upon selection of a browse button on the user interface;

determining whether a size of the file is below a specified maximum file size;

said file including multiple files, wherein the multiple files are sent as one file in a compressed format;

in response to a selection of the scan icon, scanning the file for malicious code using a malicious code identification database to identify malicious code;

updating the malicious code identification database daily;

sending an indication that the file does not contain malicious code from the server to the client utilizing the Internet if no malicious code is found in the file during the scanning;

sending an indication that the file contains malicious code from the server to the client utilizing the Internet if malicious code is found in the file during the scanning;

said indication that the file contains malicious code including a name of the malicious code;

wherein the indications are sent via the user interface; and wherein the malicious code is at least one of a virus, worm, and Trojan.

67. A network-based method for scanning data, comprising:

displaying at a client a web-based graphical user interface including a first data selection icon and a second scan icon, which is loaded via a network browser;

in response to a selection of the first data selection icon, displaying a window showing a plurality of files stored on the client;

receiving a manual selection of at least one of the files as data to be received from the client;

in response to a selection of the second scan icon, receiving the data from the client at a server utilizing a network and the web-based graphical user interface, such that the data is transmitted from the client to the server to scan the data at the server for analysis purposes;

identifying information associated with the data at the server prior to scanning the data and comparing the information to information stored in a database;

generating a solution at the server if malicious code is found in the data during the scanning; and sending the solution from the server to the client utilizing the network;

wherein if the selected at least one of the files is password protected, a window is displayed for entering at least one associated password.

68. A network-based method for scanning data, comprising:

displaying at a client a web-based graphical user interface including a first data selection icon and a second scan icon, which is loaded via a network browser;

in response to a selection of the first data selection icon, displaying a window showing a plurality of files stored on the client;

receiving a manual selection of at least one of the files as data to be received from the client;

in response to a selection of the second scan icon, receiving the data from the client at a server utilizing a network and the web-based graphical user interface, such that the data is transmitted from the client to the server to scan the data at the server for analysis purposes;

identifying information associated with the data at the server prior to scanning the data and comparing the information to information stored in a database;

inserting the information into the database if the information is not located in the database;

generating a solution at the server if malicious code is found in the data during the scanning; and sending the solution from the server to the client utilizing the network;

wherein if the selected at least one of the files is password protected, a window is displayed for entering at least one associated password.

* * * * *

UNITED STATES PATENT AND TRADEMARK OFFICE
CERTIFICATE OF CORRECTION

| | |
|---|---|
| PATENT NO. | : 7,302,706 B1 |
| APPLICATION NO. | : 09/968569 |
| DATED | : November 27, 2007 |
| INVENTOR(S) | : Hicks et al. |

It is certified that error appears in the above-identified patent and that said Letters Patent is hereby corrected as shown below:

col. 12, line 19 change "Internet- and" to --Internet-and--;
    col. 15, line 10 before "is" and after "file" insert --received--.

Signed and Sealed this

Ninth Day of February, 2010

David J. Kappos
*Director of the United States Patent and Trademark Office*